June 18, 1968 J. D. UPCHURCH 3,388,417
CLOSURE HINGE
Filed June 28, 1965

INVENTOR.
Joseph D. Upchurch
BY
Herbert Furman
ATTORNEY

United States Patent Office 3,388,417
Patented June 18, 1968

3,388,417
CLOSURE HINGE
Joseph D. Upchurch, Warren, Mich., assignor to General Motors Corporation, Detroit, Mich., a corporation of Delaware
Filed June 28, 1965, Ser. No. 467,331
6 Claims. (Cl. 16—128.1)

ABSTRACT OF THE DISCLOSURE

A closure hinge for use on vehicle bodies which includes a mounting member of L-shape in elevation and channel shape in cross section. The channel hinge member is pivoted to one leg of the mounting member and a channel shaped link is pivoted intermediate the ends of the hinge member. A pin extends between the side walls of the link member at the other end thereof and a shoe is pivoted on this pin. The other end of the link member and the shoe are received between the side walls of the other leg of the mounting member, with the shoe riding on the base wall of this other leg and the free ends of the pin riding on edges of the side walls of the other leg. A coil tension spring is hooked between the shoe and the front end of the other leg of the mounting member to bias the shoe along the base wall of the other leg. The juncture between the legs of the mounting member provides a stop for the shoe in the folded position of the link member and hinge member and the engagement of the free ends of the shoe pin with notches in the side walls of the other leg provide a stop in the unfolded position of the link member and hinge member.

Specification

This invention relates to closure hinges and more particularly to vehicle body closure hinges and hold-opens.

One feature of this invention is that it provides an improved vehicle body closure hinge. Another feature of this invention is that the closure hinge includes a hinge member swingably mounted on a hinge support member and a link member interconnecting the hinge member and the hinge mounting member. A further feature of this invention is that the link member is pivoted adjacent one end thereof to the hinge member and has the other end thereof pivotally and slidably mounted on the hinge mounting member. Yet another feature of this invention is that the link member and hinge member unfold relative to each other as the hinge member moves between open and closed positions. Yet a further feature of this invention is that the link member is nested within the hinge member when the hinge member is in closed position.

Figure 1:
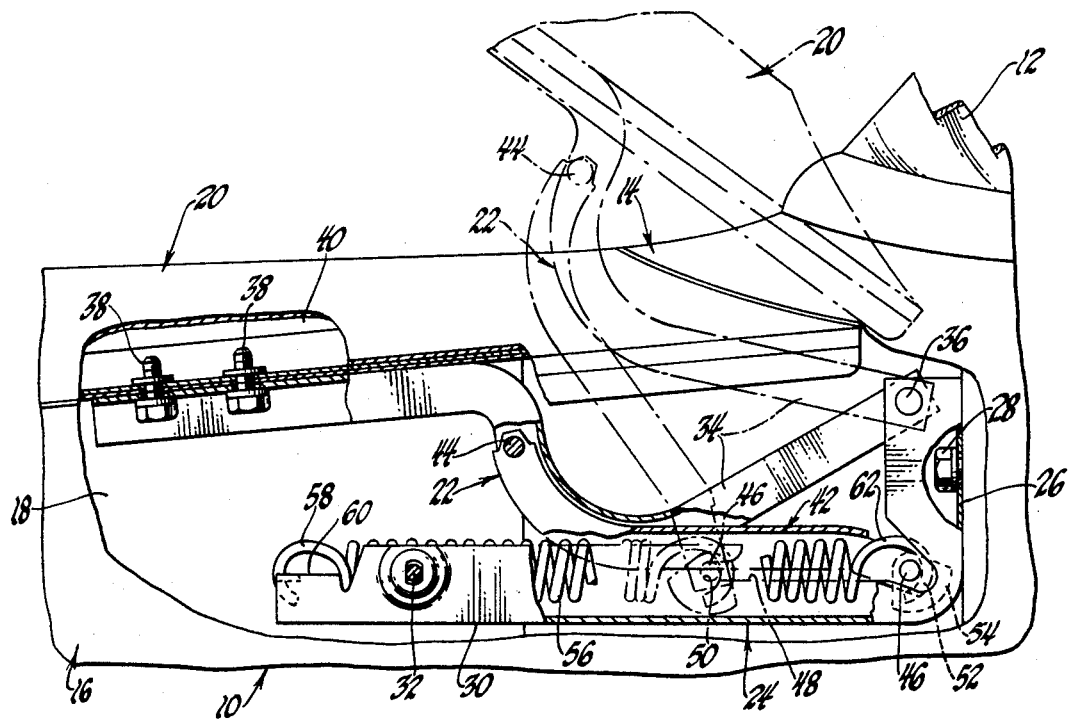
Figure 2:
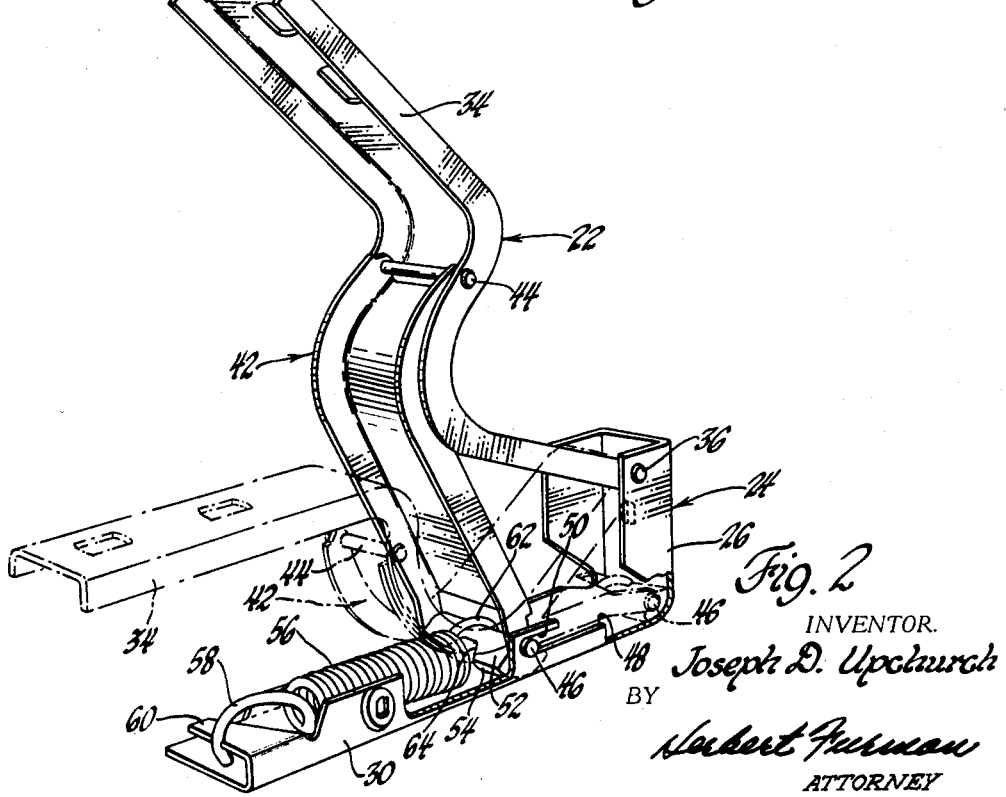

These and other features of the hinge of this invention will be apparent from the following specification and drawings wherein:

FIGURE 1 is a partially broken away partial side elevational view of a vehicle body embodying a closure hinge according to this invention; and FIGURE 2 is a perspective view of the hinge in the open position thereof.

Referring now particularly to FIGURE 1 of the drawing, a vehicle body designated generally 10 includes a windshield 12, cowl structure 14, and fenders or other body panel structures 16 which cooperate with the panel structure 14 to define a body compartment 18. The compartment 18 is opened and closed by a body closure or hood 20 which is mounted on the body for movement between a closed position, as shown in full lines, and an open position, as shown in dot-dash lines, by a pair of laterally spaced closure hinges 22 according to this invention. Only one hinge is shown, but it will be understood that the other hinge is of like construction, although of different hand.

The hinge 22 includes a hinge box or hinge mounting member 24 which is generally of L-shape when viewed in elevation and of channel shape cross section. The shorter leg 26 of member 24 is bolted at 28 to the cowl structure 14 of the body and the longer leg 30 of member 24 is bolted at 32 to the fender structure 16 of the body to mount the member 24 on the body. A gooseneck type hinge arm 34 of generally channel shaped cross section is of smaller size than member 24 and has one end thereof pivoted at 36 to the shorter leg of the member 24. The other end of the hinge arm 34 is adjustably bolted at 38 to a bracket or inner panel 40 of the closure 20 so as to mount the closure 20 on the body 10 for swinging movement between open and closed positions about an axis defined by the axis of the pin 36.

A link member 42 of generally channel shaped cross section is of slightly smaller size than the hinge arm 34 and has one end thereof pivoted at 44 to an intermediate portion of the hinge arm. The other end of the link member 42 mounts a pin 46 which extends outwardly to each side of the link member and rides in slots or guide tracks 48 provided in the longer leg 30 of the member 24. It will be noted that the tracks 48 open generally upwardly of the body or in the direction of the hinge arm 34 except for portions 50 at the forward ends thereof for a purpose to be hereinafter described.

A guide shoe 52 of generally triangular cross section has an arcuate surface or portion 54 thereof slidably engaged with the lower or base wall of the leg 30 of the member 24. The shoe 52 is swingably mounted on the pin 46 between the legs of the link member 42. A coil tension spring 56 has one end 58 thereof hooked within a notch in a bent tab 60 of one wall of the member 24 and the other end 62 thereof hooked over the guide shoe 52, with this shoe being notched at 64, FIGURE 2, so as to accommodate this end of the spring.

The hinge 22 and the closure 20 are shown in closed position in full lines in FIGURE 1 and in dot-dash lines in FIGURE 2. It will be noted that in this position of the hinge, the link member 42 nests within the portion of the hinge arm 34 located between the pivots 36 and 44 and between this portion of the hinge arm and member 24. The guide shoe 52 is located at the juncture of the legs of the member 24. A line through the axes of the pins 44 and 46 intersects a line through the axes of the pins 36 and 44 at an acute angle.

The hinge 22 and closure 20 are shown in open position in dot-dash lines in FIGURE 1 and in full lines in FIGURE 2. It will be noted that when the hinge 22 moves to an open position, the link member 42 moves forwardly and upwardly with respect to the pivot 36 as the pin 46 moves along the guide tracks 48 and the lower surface 54 of the shoe 52 moves along the base wall of the leg 30 of the hinge member under the action of the spring 56. The link member 42 and the portion of the hinge arm 22 between the pivots 36 and 44 unfold relative to each other and a line through the axes of the pins 44 and 46 intersects a line through the axes of the pins 36 and 44 at an increased angle compared to the angle when the hinge 22 is in closed position. The open position of the hinge is set by the engagement of the ends of the pin 46 with the portions 50 of the guide tracks 48.

Thus, this invention provides an improved closure hinge.

I claim:

1. A vehicle body closure hinge comprising, in combination, a hinge mounting member, a hinge member pivotally mounted adjacent one end thereof on said mounting member for swinging movement between open and closed positions with respect thereto, a link member pivoted adjacent one end thereof to an intermediate portion of the hinge member for swinging movement between folded and unfolded positions relative thereto, guide means on the hinge mounting member defining a predetermined track located to one side of a line between the hinge member pivot and the link member pivot in the open and closed positions of the hinge member, guided means secured to the other end of the link member and movable along the guide means track as the link member swings relative to the hinge member, said link member being located in the folded position relative to the hinge member and the guided means being located adjacent the hinge member pivot in the closed position of the hinge member, and means for moving the guided means along the guide means track in a direction away from the hinge member pivot to unfold the hinge member and link member and increase the distance between the guided means and the hinge member pivot to move the hinge member to open position.

2. The combination recited in claim 1 wherein the mounting member includes spaced stop means locating the guided means relative to the guide means track to locate the hinge member in the open and closed positions.

3. The combination recited in claim 1 wherein the moving means includes resilient means interconnected between the guided means and the mounting means and biasing the guided means away from the hinge member pivot.

4. The combination recited in claim 1 wherein the hinge mounting member includes a base wall and spaced side walls, the guided means including a shoe pivoted to the other end of the link member and movable along the base wall between the side walls.

5. The combination recited in claim 4 wherein the shoe is pivoted by a pin to the link member and the free ends of the pin are movable along edges provided on the side walls of the mounting member.

6. A vehicle body closure hinge comprising, in combination, a generally L-shaped hinge mounting member, each leg thereof having a base wall and a pair of side walls, a hinge member pivotally mounted adjacent one end thereof to the side walls of one leg of the mounting member for swinging movement between open and closed positions with respect thereto, a link member pivoted adjacent one end thereof to an intermediate portion of the hinge member for swinging movement between folded and unfolded positions relative thereto, the base wall and side walls of the other mounting member leg defining a track located to one side of a line between the hinge member pivot and the link member pivot in the open and closed positions of the hinge member, a shoe pivotally secured by a pin to the other end of the link member, the shoe being movable along the track base wall and the free ends of the pin being movable along edges of the track side walls as the link member swings relative to the hinge member, the shoe being engageable with the one leg adjacent the juncture thereof with the other leg to locate the link member in folded position relative to the hinge member in the closed position of the hinge member, resilient means interconnected between the shoe and the other leg for moving the shoe along the track base wall in a direction away from the one leg to unfold the hinge member and link member and move the hinge member to open position, and means on the other leg side walls engageable by the free ends of the pin to locate the shoe upon movement thereof along the track base wall to locate the link member in unfolded position relative to the hinge member.

References Cited
UNITED STATES PATENTS

| | | | |
|---|---|---|---|
| 2,358,561 | 9/1944 | Davis | 16—188 |
| 2,538,607 | 1/1951 | Vaca | 16—146 |
| 3,207,565 | 9/1965 | Scharge | 16—179 |
| 3,209,392 | 10/1965 | Levine | 16—190 |

BOBBY R. GAY, *Primary Examiner.*

MARVIN A. CHAMPION, *Examiner.*

D. L. TROUTMAN, *Assistant Examiner.*